Figure 1:
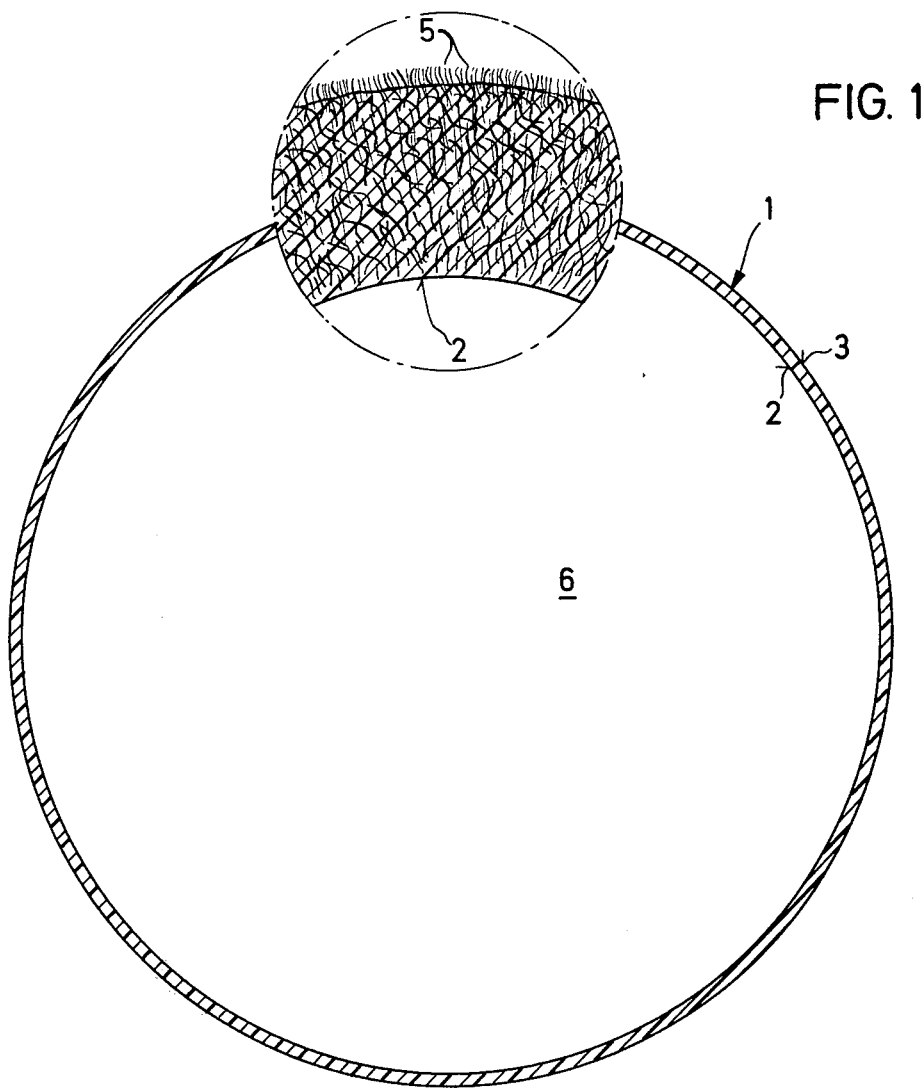

United States Patent [19]

Gerigk et al.

[11] 4,006,756
[45] Feb. 8, 1977

[54] FIBER REINFORCED REGENERATED CELLULOSE SAUSAGE CASING FOR DRY SAUSAGES

[75] Inventors: Günter Gerigk, Oberursel; Rudolf Stryk, Wiesbaden-Bierstadt, both of Germany

[73] Assignee: Hoechst Aktiengesellschaft, Germany

[22] Filed: Sept. 13, 1972

[21] Appl. No.: 288,479

[30] Foreign Application Priority Data

Sept. 15, 1971 Germany .................... 7135052[U]

[52] U.S. Cl. ............................ 138/118.1; 426/105
[51] Int. Cl.² ........................................ A22C 13/00
[58] Field of Search .......... 426/140, 138, 135, 105, 426/420, 132; 161/176, 178; 117/95; 17/42, 49; 138/118.1; 3/1, 1.4; 128/334

[56] References Cited

UNITED STATES PATENTS

| 2,101,958 | 12/1937 | Sachsenroder | 138/118.1 |
|---|---|---|---|
| 2,201,457 | 5/1940 | Smith et al. | 138/118.1 |
| 2,210,436 | 8/1940 | Weingand et al. | 138/118.1 |
| 3,186,018 | 6/1965 | Shaw | 161/178 X |
| 3,369,911 | 2/1968 | Witzleben | 138/118.1 |
| 3,378,379 | 4/1968 | Shiner et al. | 117/95 |
| 3,411,979 | 11/1968 | Lewis, Jr. | 161/178 |
| 3,687,129 | 8/1972 | Nuwayser | 128/334 R |
| 3,878,565 | 4/1975 | Sauvage | 3/1.4 X |

Primary Examiner—Richard C. Queisser
Assistant Examiner—Daniel M. Yasich
Attorney, Agent, or Firm—James E. Bryan

[57] ABSTRACT

A regenerated cellulose sausage casing having a fiber fleece embedded therein, for dry sausages. The improvement comprises an outer surface exhibiting at least part of the fibrous roughness of the fiber fleece embedded therein.

1 Claim, 2 Drawing Figures

U.S. Patent

Feb. 8, 1977

4,006,756

FIBER REINFORCED REGENERATED CELLULOSE SAUSAGE CASING FOR DRY SAUSAGES

The present invention relates to a sausage casing of regenerated cellulose which is reinforced by a fibrous layer consisting, e.g., of a paper fleece, and in which the fibrous structure of the reinforcing layer is visible on the outer surface of the sausage casing.

Artificial sausage casings of regenerated cellulose reinforced by a fibrous layer are known. In the past, it was deemed necessary for the outer surface of a regenerated cellulose sausage casing to be smooth, and, consequently, sausage casings were manufactured with smooth outer surfaces. These sausage casings comply with the requirements for natural ripening as regards their water vapor permeability and dying characteristics and facilitate the metabolism of the fungi growing thereon because they act as semi-permeable membranes. However, they have the disadvantage that the layer of fungi usually develops in an irregular fashion, in the form of islands, and frequently tends to drop off because of the smooth, shiny surface of the sausage casings. In addition to the fermentative and bacterial processes within the sausage meat, an unobjectionable growth and uniform formation of the fungi as well as their satisfactory adhesion are important factors for the ripening process and determine, besides other factors, the taste, smell and appearance which are characteristic of salamis.

The present invention provides a sausage casing which is more suitable than hitherto used sausage casings for the production of dry sausages, especially of salamis which become covered with a mold layer during the ripening process. As has been found, the mold forms within a much shorter time and much more evenly on fiber-reinforced sausage casings when the outer surface of the sausage casing still shows the fibrous structure of the fiber layer used for reinforcing it. Accordingly, the present invention provides a regenerated cellulose sausage casing, with a fiber fleece embedded therein, for dry sausages, in which its outer surface shows at least some of the fibrous roughness of the fiber fleece embedded in the casing.

In the manufacture of known celllulose hydrate sausage casings having a fiber fleece (fibrous tube) embedded therein, viscose is applied to the outer surface of a fiber fleece formed into a tube, and the viscose which penetrates into the absorptive fiber fleece is then converted into regenerated cellulose by passing the tube through an acid bath. The tube produced in this manner is then desulfurized, washed, softened, and finally dried while in the inflated state.

A tube produced in this manner has a smooth, shiny outer surface, whereas its interior surface is relatively rough due to the protruding fiber particles of the fiber fleece.

Now it has been found that a regenerated cellulose sausage casing with a fiber fleece embedded therein is particularly suitable for the production of salamis of the type described, when the rough surface of sausage casings produced by the conventional process is placed on the outside. From the beginning, the rough surface facilitates an even, continuous growth of the mold layer during the ripening process and improves its adhesion to the surface of the sausage casing, while the sausage casing retains all the characteristics required for the ripening of the sausage. Most importantly, the growth of the fungus layer requires a considerably shorter time than in the case of casings having a smooth surface.

Further, it has been found that the novel casings have an improved resistance against defects caused by cellulose-destroying bacteria which may occur during the natural ripening process. This is due to the higher proportion of natural cellulose present on the outside of the tube, which is biochemically more stable than is regenerated cellulose.

Still another advantage of the sausage casings of the invention is their improved shrinkability, as compared with casings having an external viscose layer. As a result, the sausage casings harden more rapidly and are ready for cutting sooner.

Further, it has been found, as another advantage, that when dry sausages having a rough surface are treated with impregnating liquids, the solutions attach themselves more readily and adhere faster to the casings, especially near the folds at the ends of the sausages, where it may happen, in the case of cellulose casings having a smooth outer surface, that the coating lifts off and an undesirable growth of mold forms beneath the coating.

The displacement of the rough surface to the outside of the sausage casing — or its formation on the outside — may be performed by various methods. Thus it is possible, e.g., for a sausage casing produced in the customary manner, i.e. by application of the viscose to the outer surface of the fiber fleece, to be turned inside out after its manufacture. It is more advantageous and convenient, however, if, from the beginning the viscose is applied not to the outside of the fiber fleece formed into a tube, as in the customary process, but to its inside, and the tube is then further treated in the normal manner. Comparison tests which were carried out in practice have shown that a sausage casing of the type described also meets all the requirements when the viscose is applied to both sides of the fiber fleece, from the outside as well as from the inside. In this case, however, the quantity of viscose applied to the outside of the fleece should not exceed 25 percent of the total quantity applied to both sides of the tube.

Since dry sausages produced by the natural ripening process undergo substantial contractions in volume, due to loss of water, it is advisable to impregnate the interior surface of the tube with substances which improve the adhesion of the sausage meat, without substantially detracting from the peelability of the sausage casing. An appropriate process is described, e.g., in German Patent Specification No. 609,129.

The accompanying drawings serve to further illustrate the invention. In the drawings, FIG. 1 represents a tubular sausage casing, in cross-section, and FIG. 2 is a section of the sausage casing shown in FIG. 1.

Figure 2:
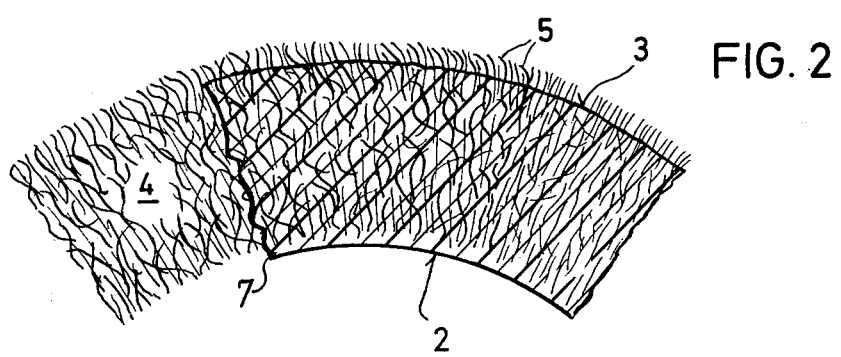

In FIG. 1, the numeral 1 the sausage the sausage casing, 2 is the interior surface and 3 the exterior surface of the sausage casing, and 6 is the filling space. In the enlarged section of FIG. 1, 5 is the nap of the fiber fleece which protrudes from the outside surface of the sausage casing, and 2 is the inside of the sausage casing which is free from the fiber fleece. The wall of the sausage casing contains a fiber matrix. This is shown in FIG. 2, in which 4 indicates a fibrous tube and 7 cellulose.

For better illustration, the wall of the sausage casing is shown disproportionately thick, as compared with the diameter of the free space enclosed thereby.

It will be obvious to those skilled in the art that many modifications may be made within the scope of the present invention without departing from the spirit thereof, and the invention includes all such modifications.

What is claimed is:
1. In a regenerated cellulose sausage casing having a fiber fleece embedded therein, for dry sausages,
    the improvement comprising an outer surface exhibiting at least part of the fibrous roughness of the fiber fleece embedded therein.

* * * * *